US012799905B2

(12) United States Patent
Chen et al.

(10) Patent No.: US 12,799,905 B2
(45) Date of Patent: Nov. 17, 2026

(54) VALUE-MOVING DEVIATION METHOD FOR ACQUIRING CYCLE-STAGE COMBUSTION PARAMETERS OF ENGINE BASED ON MULTIPLE SENSING SIGNALS

(71) Applicant: Tianjin University, Tianjin (CN)

(72) Inventors: Tao Chen, Tianjin (CN); Zengchun Wei, Tianjin (CN); Zhuoxiao Yao, Tianjin (CN); Shuo Li, Tianjin (CN); Guoli Zhang, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 19/312,297

(22) Filed: Aug. 28, 2025

(65) Prior Publication Data

US 2026/0063086 A1 Mar. 5, 2026

(30) Foreign Application Priority Data

Aug. 28, 2024 (CN) ......................... 202411197045.2

(51) Int. Cl.
*F02D 41/14* (2006.01)
*F02D 41/06* (2006.01)
*F02D 41/40* (2006.01)

(52) U.S. Cl.
CPC ......... *F02D 41/1401* (2013.01); *F02D 41/06* (2013.01); *F02D 2041/1433* (2013.01); *F02D 41/401* (2013.01)

(58) Field of Classification Search
CPC ......... F02D 41/1401; F02D 2041/1433; F02D 41/061; F02D 41/401
See application file for complete search history.

(56) References Cited

U.S. PATENT DOCUMENTS

2008/0249677 A1* 10/2008 Kruger .................. F02D 35/023 73/114.28
2009/0159046 A1* 6/2009 Moriya ................. F02D 35/023 123/435

(Continued)

OTHER PUBLICATIONS

CNIPA First Office Action, Application No. 202411197045.2, dated Apr. 11, 2025, Chinese original, pp. 1-7.

(Continued)

*Primary Examiner* — Syed O Hasan
(74) *Attorney, Agent, or Firm* — Nitin Kaushik

(57) ABSTRACT

A value-moving deviation method for acquiring cycle-stage combustion parameters of an engine based on multiple sensing signals includes: with prior values of combustion feature parameters under each piece of working condition information as a reference, reconstructing combustion feature parameter values based on signal features acquired by sensors of the engine, and calculating deviations between the combustion feature parameter values and the prior values and weights of the deviations; obtaining a fusion deviation of the combustion feature parameters as a transient fluctuation amount of the combustion feature parameters; correcting, based on the value-moving deviation method, the prior values according to the obtained transient fluctuation amount, so as to obtain actual values of the combustion feature parameters of a current cycle of the engine; and updating, according to a Weber equation, a combustion heat release rate curve to obtain each piece of transient combustion parameter information under a current working condition.

5 Claims, 5 Drawing Sheets

(56) References Cited

U.S. PATENT DOCUMENTS

2010/0006065 A1 * 1/2010 Tripathi ................ F02P 5/1512
123/481
2019/0136771 A1 * 5/2019 Engfehr ................ F02D 41/009

OTHER PUBLICATIONS

CNIPA First Office Action, Application No. 202411197045.2, dated Apr. 11, 2025, English translation, pp. 1-6.

* cited by examiner

VALUE-MOVING DEVIATION METHOD FOR ACQUIRING CYCLE-STAGE COMBUSTION PARAMETERS OF ENGINE BASED ON MULTIPLE SENSING SIGNALS

TECHNICAL FIELD

The present disclosure relates to the technical field of engines and combustion control of the engines, and in particular to a value-moving deviation method for acquiring cycle-stage combustion parameters of an engine based on multiple sensing signals.

BACKGROUND

Owing to gradual deepening of vehicle intelligence and electrification, rapid development of a new technology to improve performance of engines to reduce emission and improve fuel economic efficiency has made further optimization of an engine combustion control technology a pressing and important issue.

Real-time state monitoring of the engine is necessary for development of a new engine combustion control technology, and the lack of combustion parameters hinders development of such engine combustion control technology. Because it is very difficult to directly measure combustion state parameters, they are generally obtained by constructing engine combustion models and looking up a prior calibration map of the combustion parameters. However, calculation of the engine combustion model is complex, and is incapable of satisfying real-time requirements of engine combustion control; moreover the prior calibration map of the combustion parameters reflects multi-cycle average values of all air cylinders of the engine under a calibration working condition, and is incapable of reflecting changes in combustion information between cycles and between different air cylinders. Thus, it is incapable of accurately reflecting changes in the combustion parameters in all cycles of all working conditions under a real condition.

To improve accuracy of the combustion parameters, so as to optimize control of the engine at a cycle stage, it is the most feasible to extract key combustion information from an existing sensing signal, and a method for reconstructing combustion parameters through a cylinder pressure sensing signal, a crankshaft position sensing signal, and a knock sensor vibration signal (hereinafter referred to as a knock signal) has been developed. However, it is still extremely expensive to additionally install a cylinder pressure sensor at present, and a harsh combustion environment inside a cylinder will greatly shorten service life of the sensor, resulting in an incapability to extensively use the cylinder pressure sensor. To avoid use of the cylinder pressure sensor, a technology method for extracting combustion information based on a sensing signal widely equipped in a modern engine has received widespread attention. However, accuracy of reconstruction of the combustion parameters only through the sensing signal relies heavily on a working state of the sensors and is susceptible to noise interference. These issues are particularly prominent when the combustion parameters are reconstructed only by using a single sensing signal.

Moreover, some studies predict the combustion parameters by using a neural network model. Although such a method has excellent real-time performance, its computational accuracy is closely related to data quality of a training set and a degree of coverage of working conditions. It is not realistic for the engine to build a training set that includes all operating conditions. So, it is urgent to develop a novel method for acquiring cycle-stage combustion parameters, which balances real-time performance and accuracy requirements, so as to provide reference for further optimization of the engine combustion control technology.

SUMMARY

An objective of the present disclosure is to provide a value-moving deviation method for acquiring cycle-stage combustion parameters of an engine based on multiple sensing signals, which can accurately acquire the cycle-stage combustion parameters in real time.

In order to achieve the above objective, the present disclosure provides a value-moving deviation method for acquiring cycle-stage combustion parameters of an engine based on multiple sensing signals. The method includes:

S1, acquiring average values of combustion feature parameters of the engine under different working conditions as prior values, and storing the prior values by means of a mathematical model or a map table; establishing shape base models of key shape parameters of Weber equations of combustion heat release rate curves under different working conditions; and establishing a shape relation model of a correction relation between deviation values of the combustion feature parameters and the key shape parameters under each specific working condition;

S2, looking up, according to current working condition information, the mathematical model or the map table storing the prior values of the combustion feature parameters to acquire the prior values of the combustion feature parameters under a current working condition, and obtaining the key shape parameters $a_{base}$ and $m_{base}$ of the Weber equation of the combustion heat release rate curve under the current working condition from the shape base model;

S3, reconstructing combustion feature parameter values based on signal features acquired by a plurality of sensors of the engine, calculating deviations between reconstructed values and the prior values of the combustion feature parameters separately, and determining a weight corresponding to each deviation by means of a probability distribution of the deviations;

S4, performing, based on the determined deviation weights, weighted summation on the deviations to obtain a fusion deviation of the combustion feature parameters as a real-time deviation amount of the combustion feature parameters;

S5, correcting, according to the obtained real-time deviation amount, the prior values to obtain actual feature values; and S6, correcting, according to the actual feature values obtained in S3 and the shape relation model, the key shape parameters $a_{base}$ and $m_{base}$ of the Weber equation obtained by means of the shape base model, and updating a mathematical expression of the combustion heat release rate curve to obtain each combustion parameter value under a current cycle.

Preferably, in S1, the prior values of the combustion feature parameters, heat release rate basic shape parameters and a shape parameter correction relation are empirical values of the combustion feature parameters of the engine related to working condition information, and are obtained by means of the engine bench experiment or the simulation calculation.

Preferably, in S3, a process for reconstructing the combustion feature parameter values includes: preprocessing each sensing signal, comparatively analyzing a preprocessed sensing signal curve and a cylinder pressure curve and the heat release rate curve, extracting feature information related to a combustion state of the engine, and establishing a mapping model or a function of a relation between the sensing signal feature information and the combustion feature parameters according to correlation between the sensing signal feature information and the combustion feature parameters.

Preferably, a method for determining the deviation weight includes:

establishing a relation between experimental values and the prior values of the combustion feature parameters based on a deviation method:

$$Y = \overline{X} + K_i(X_i - \overline{X}),$$

where Y is the experimental value of the combustion feature parameters; $X_i$ is the reconstructed value of an i-th combustion feature parameter, and is independent of each other; $K_i$ is the deviation weight corresponding to $X_i$; and $\overline{X}$ is the prior value of the combustion feature parameters; and then determining the deviation weight corresponding to the reconstructed value of each combustion feature parameter according to a method of a minimum variance of the experimental values of the combustion feature parameters.

Preferably, in S3, a method for calculating the fusion deviation includes:

calculating the deviation between the reconstructed value and the prior value of each combustion feature parameter; then calculating the deviation weight corresponding to the reconstructed value of each combustion feature parameter; and performing weighted summation on all deviation values to obtain the fusion deviation, where a specific expression is as follows:

$$\Delta X = \sum_{i=1}^{n} K_i\left(f_i(\delta_i) - \overline{X}\right),$$

where ΔX is the fusion deviation, n is the number of types of sensing signals, and $f_i(\delta_i)$ represents the reconstructed value of the combustion feature parameter corresponding to an i-th piece of sensing signal feature information.

Preferably, the value-moving deviation method refers to movement of the combustion feature parameter values on the combustion heat release rate curve based on the fusion deviation, where value-moving indicates movement of representative combustion feature parameter values on the combustion heat release rate curve, and is specifically expressed as follows:

$$Z_{core} = \overline{X} + \Delta X = \overline{X} + \sum_{i=1}^{n} K_i\left(f_i(\delta_i) - \overline{X}\right),$$

where $Z_{core}$ is the combustion feature parameter value obtained after value-moving.

Preferably, a method for updating the combustion heat release rate curve specifically includes:

updating, according to the shape relation model of the correction relation between the deviation values of the combustion feature parameters and the shape parameters of the Weber equation under the specific working condition, $a_{base}$ and $m_{base}$ obtained from the shape base model to obtain updated key shape parameters a and m of the Weber equation; and substituting updated combustion feature parameters, a and m into the Weber function to obtain the combustion heat release rate curve of a cycle of the current working condition, so as to further obtain each combustion parameter value, specifically as follows:

$$Q(\theta) = 1 - \exp\left[-a\left(\frac{\theta - \theta_0}{\Delta\theta}\right)^m\right],$$

where Q(θ) is a cumulative heat release rate when a crankshaft angle is θ; $\theta_0$ is the crankshaft angle corresponding to a starting combustion moment; and Δθ is combustion duration;

and a and m are shape parameters and depend on a working condition state.

Preferably, calculation of the combustion parameters is completed within a single cycle of the engine, and the cycle-stage combustion parameters are obtained.

Thus, the above value-moving deviation method for acquiring cycle-stage combustion parameters of an engine based on multiple sensing signals is used in the present disclosure, and has the following technical effects:

(1) the combustion feature parameters are divided into two parts of a steady state and a transient state by means of the value-moving deviation method, and a transient change of the combustion feature parameters is reflected by taking the prior values as a steady-state reflection amount and the fusion deviation of each sensor as a transient fluctuation amount, so as to accurately acquire the cycle-stage combustion parameters in real time; and (2) the fusion deviation is calculated by means of the plurality of sensing signal features. Thus, calculation accuracy of the combustion parameters can be improved, and dependence of calculated values of the combustion parameters on sensor working states can be further reduced.

The technical solutions of the present disclosure will be further described in detail below by means of the accompanying drawings and the examples.

DETAILED DESCRIPTIONS OF THE EMBODIMENTS

The present disclosure can be explained in more detail by means of the following examples. The purpose of disclosing the present disclosure is to protect all changes and improvements within the scope of the present disclosure, and the present disclosure is not limited to the following examples.

Figure 1:
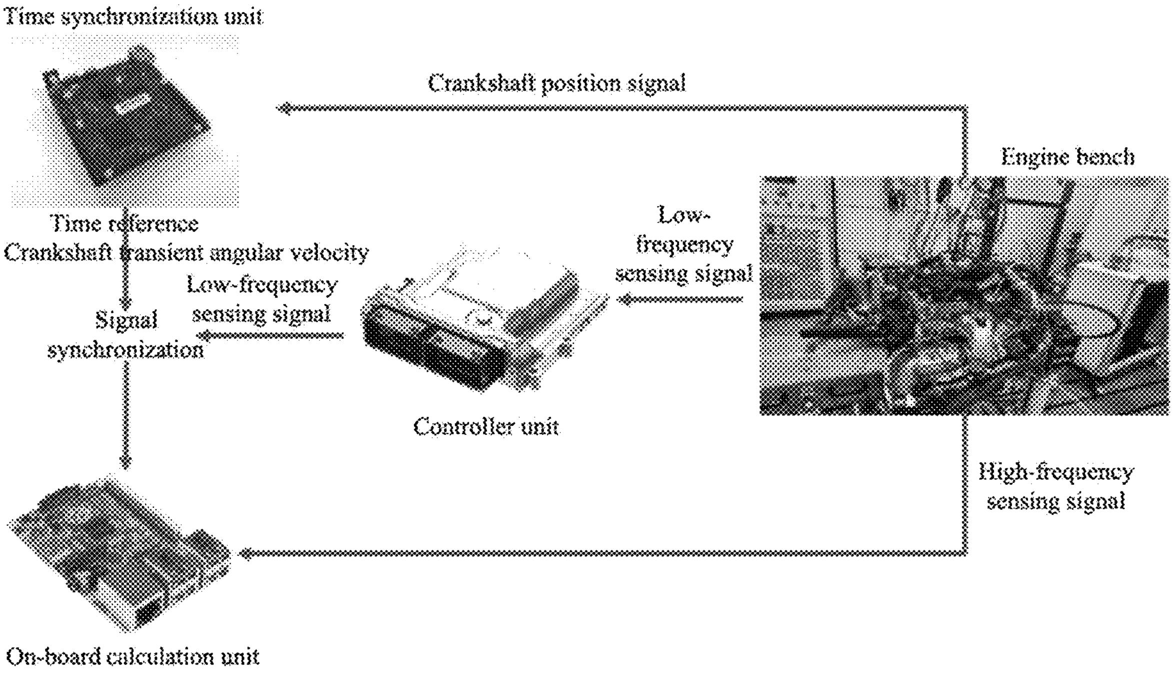
FIG. 1 is a schematic diagram of an experimental test platform in an example of a value-moving deviation method for acquiring cycle-stage combustion parameters of an engine based on multiple sensing signals.

As shown in FIG. 1, a value-moving deviation method for acquiring cycle-stage combustion parameters of an engine based on multiple sensing signals is performed on an experimental test platform in the example. The experimental test platform includes an engine bench, a time synchronization unit, a controller unit, a combustion analyzer and an on-board calculation unit. Functions of each component are specifically as follows:

(1) The engine bench operates under a command of the controller unit, and the controller unit acquires sensing signals by means of sensors arranged on the engine.

(2) The time synchronization unit has two main functions. One function is to collect a crankshaft position signal and calculate a crankshaft transient angular velocity, and the other function is to determine a time reference to synchronize the signals.

On one hand, the unit collects the crankshaft position signal, records sampling point time, and calculates the crankshaft transient angular velocity by identifying a time interval between a rising edge and an adjacent rising edge of a crankshaft position square wave signal. On the other hand, the time synchronization unit determines a tooth missing position according to the crankshaft position square wave signal as a starting point for determining a tooth position, so as to obtain a time clock of a running process of the engine, and further determines the time reference for sensing signal transmission to synchronize the signals.

(3) The combustion analyzer is used for collecting, recording and analyzing engine combustion information, thereby providing reference for a calculation result of the value-moving deviation method.

(4) The on-board calculation unit is a high-performance calculation unit in which the value-moving deviation method is configured, and may satisfy analysis calculation of the sensing signals, calculation of a combustion feature parameter reconstruction model, and calculation of the value-moving deviation method.

Figure 2:
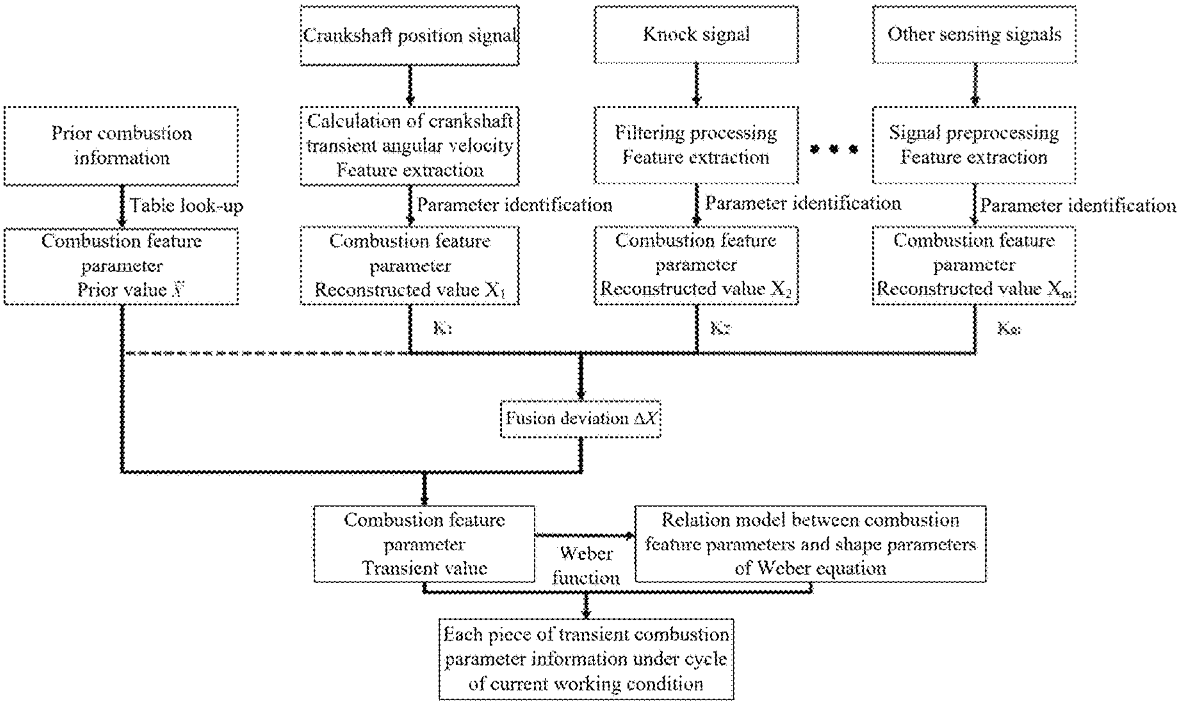
FIG. 2 is a schematic diagram of a principle of a value-moving deviation method in an example of a value-moving deviation method for acquiring cycle-stage combustion parameters of an engine based on multiple sensing signals.

As shown in FIG. 2, the value-moving deviation method for acquiring cycle-stage combustion parameters of an engine based on multiple sensing signals according to the present disclosure is further explained by means of the following examples.

Example 1

Firstly, for a case of n=0, combustion parameters are acquired by means of prior information. Specific steps are as follows:

according to current working condition parameters, prior values of combustion feature parameters of an engine are acquired by means of table look-up, a neural network model, etc., and may reflect multi-cycle average values of all air cylinders in a steady state. For a non-calibration working condition, the prior values are acquired by means of interpolation or neural network fitting.

Example 2

For a case of n=1, a sensing signal only includes a crankshaft position signal. Combustion parameters are acquired based on prior information of combustion feature parameters and the crankshaft position signal, specifically as follows:

a prior value $\overline{X}$ of combustion feature parameters is acquired by looking up a prior calibration map, and the combustion feature parameters are constructed based on crankshaft position signal features to obtain a reconstructed value $X_1$ of the combustion feature parameters; and according to a deviation between the reconstructed value and the prior value, the prior value is adjusted to obtain combustion feature parameter values under a current working condition and a current cycle. A process may be summarized as follows:

$$Z_{core} = \overline{X} + c(X_1 - X) = \overline{X} + c\left(f(\delta) - \overline{X}\right),$$

where $Z_{core}$ is the combustion feature parameter value after value-moving, c is a deviation weight coefficient, may be identified based on a working condition, and has a value range of (0, 1].

A method for reconstructing the combustion feature parameters based on the crankshaft position signal features is as follows:

(1) Signal Preprocessing

A crankshaft transient angular velocity is calculated by means of an original square wave signal collected by a crankshaft position sensor. Main steps include: a time synchronization unit determines a specific moment of each rising edge of a square wave signal according to a collected crankshaft position square wave signal and corresponding sampling time, and calculates a time interval $T_{k,k+1}$ between two adjacent rising edges:

$$T_{k,k+1} = T_{k+1} - T_k.$$

T represents a moment corresponding to the rising edge, and k represents the number of teeth.

The time synchronization unit calculates a crankshaft transient angular velocity $v_{k,k+1}$ according to the above time interval:

$$v_{k,k+1} = \frac{1000}{T_{k,k+1}},$$

where v represents the crankshaft transient angular velocity. Since identification of the rising edge and a falling edge of a crankshaft is influenced by a sampling frequency, the crankshaft transient angular velocity calculated by means of the above method is extremely not smooth, and signal features are not easy to observe and extract. Thus, it is necessary to filter and smooth a crankshaft transient angular velocity curve. In the example, a Gaussian filter is selected to filter and smooth the crankshaft transient angular velocity.

(2) Extraction of Signal Features

The crankshaft transient angular velocity curve and a cylinder pressure curve are comparatively analyzed, and a maximum cylinder pressure peak appears after a minimum value of the crankshaft transient angular velocity. Thus, the minimum value of the crankshaft transient angular velocity is taken as the crankshaft position signal features.

(3) Reconstruction of Combustion Feature Parameter $X_1$

Figure 3:
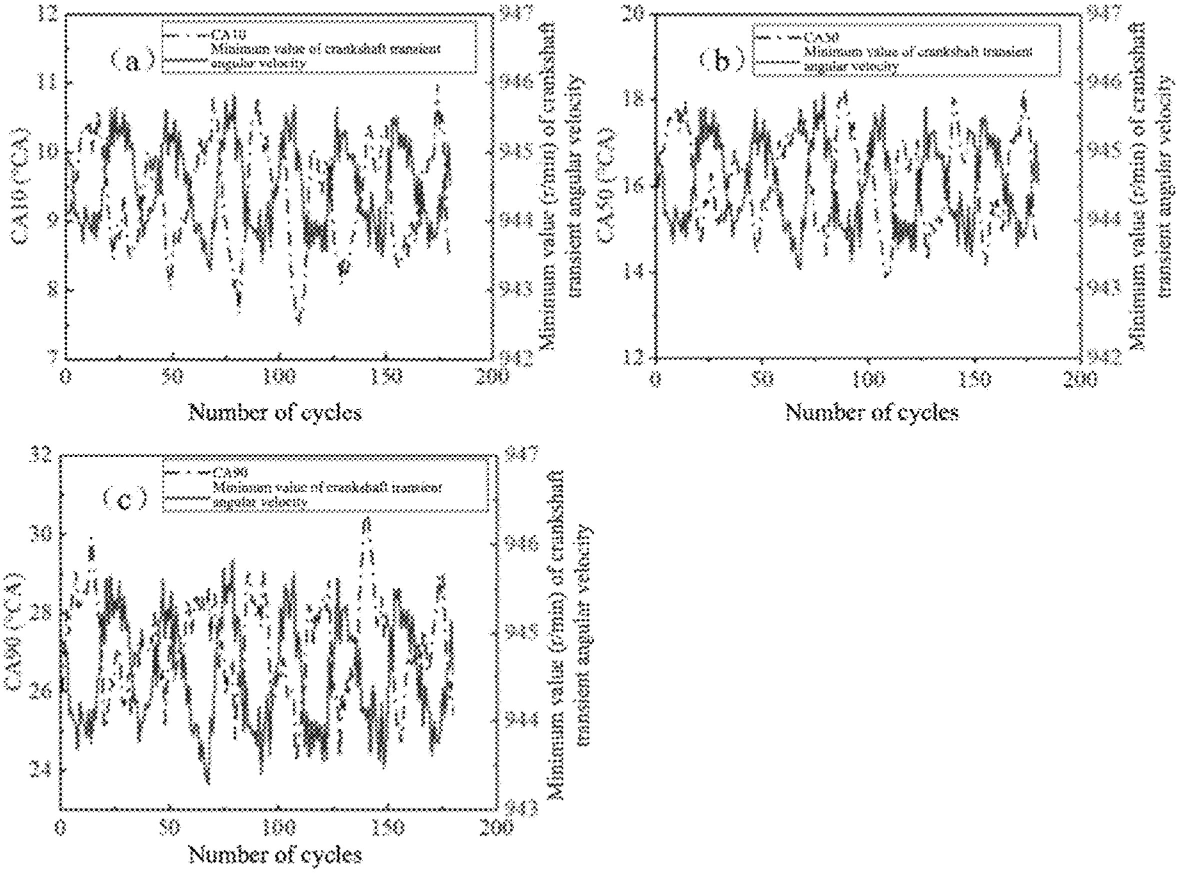
FIG. 3 is a comparison chart of crankshaft transient angular velocity minimum value features and combustion feature parameters in an example of a value-moving deviation method for acquiring cycle-stage combustion parameters of an engine based on multiple sensing signals, where (a) in FIG. 3 is a comparison chart with CA10, (b) in FIG. 3 is a comparison chart with CA50, and (c) in FIG. 3 is a comparison chart with CA90.

As shown in FIG. 3, the minimum value of the crankshaft transient angular velocity has an obvious inverse relation with each combustion feature parameter according to a correlation analysis result. Thus, a parameter identification model from the minimum value of the crankshaft transient angular velocity to each combustion feature parameter is established to reconstruct the combustion feature parameter $X_1$.

Example 3

For a case of n=2, a sensing signal includes a crankshaft position signal and a knock signal, and combustion feature parameters obtained by a value-moving deviation method are expressed as:

$$Z_{core} = \overline{X} + K_1\left(f_1(\delta_1) - \overline{X}\right) + K_2\left(f_2(\delta_2) - \overline{X}\right),$$

where $K_1$ and $K_2$ are deviation weight coefficients, and $f_1(\delta_1)$ and $f_2(\delta_2)$ are combustion feature parameter values reconstructed based on crankshaft position signal features and knock signal features respectively.

(1) According to parameters of a current working condition, a prior calibration map is looked up to acquire a prior value X of the combustion feature parameters as a core of a combustion heat release rate curve;

(2) Preprocessing of each sensing signal

A preprocessing mode of the crankshaft position signal is the same as that in Example 2.

A vibration signal acquired by a knock sensor includes a vibration signal related to combustion, and further includes a cylinder vibration signal caused by other engine components. In order to extract effective information strongly related to a combustion process, it is necessary to filter and denoise an original signal collected by the knock sensor.

Firstly, Fourier transform is performed on the original knock signal to acquire a distribution condition of the original knock signal in different frequency domains, and a frequency is sampled to obtain a discrete Fourier transform (DFT)X(k):

$$X(k) = \sum_{n=0}^{N-1} x(n)e^{-j\frac{2\pi kn}{N}},$$

where x(n) is a knock discrete signal, and N is the number of samples of discrete data.

Through the above Fourier transform, a frequency domain of signal distribution strongly related to combustion in the original knock signal is determined. In the frequency domain, coherence of an in-cylinder pressure and the knock signal is estimated to analyze a degree of correlation of the two signals:

$$C_{xy}(f) = \frac{|P_{xy}(f)|^2}{P_{xx}(f)P_{yy}(f)},$$

where $C_{xy}(f)$ represents an amplitude-squared coherence estimation, is a function of a frequency, has a value ranging from 0 to 1, and represents a degree of correspondence with y at each frequency; $P_{xx}(f)$ and $P_{yy}(f)$ are power spectral densities of x and y respectively; and $P_{xy}(f)$ is a cross power spectral density of x and y.

A coherence coefficient between the knock signal and the cylinder pressure signal is calculated by means of the above method, and it is found that the knock signal and the cylinder pressure signal have high coherence at a low frequency, especially in the frequency domain ranging from 0 Hz to 400 Hz. In order to filter out high-frequency noise, a Chebyshev low-pass filter is selected to filter the knock signal:

$$|H_n(\omega)|^2 = \frac{1}{1 + \varepsilon^2 T_n^2 \frac{\omega}{\omega_0}},$$

where $H_n(\omega)$ is a transfer function of the filter, $\varepsilon$ is a passband ripple, $T_n$ is a Chebyshev polynomial, $\omega$ is a desired cutoff frequency, and $\omega_0$ is a passband cutoff frequency.

According to a frequency domain range obtained by the above coherence analysis, the passband cutoff frequency of the Chebyshev low-pass filter is set to 200 Hz, a stopband cutoff frequency of the Chebyshev low-pass filter is set to 800 Hz, a sideband attenuation BD number of the Chebyshev low-pass filter is set to 1, and a stopband attenuation DB number of the Chebyshev low-pass filter is set to 30. An effective signal segment related to combustion in the knock signal is further extracted.

(3) Extraction of each sensing signal feature

A method for extracting signal features of the crankshaft position signal is the same as that in Example 2, and a minimum value of a crankshaft transient angular velocity is taken as the crankshaft position signal features.

A preprocessed knock signal segment and the cylinder pressure signal are comparatively analyzed, and it is found that a peak phase of the knock signal is slightly ahead of a maximum cylinder pressure phase, and a maximum cylinder pressure value has an obvious positive correlation with a peak value of the knock signal. Thus, the peak value of the knock signal is extracted as knock signal features.

(4) Reconstruction of combustion feature parameters based on each sensing signal feature A method for reconstructing the combustion feature parameters based on the crankshaft position signal is consistent with that in Example 2, and the combustion feature parameters reconstructed based on the crankshaft position signal are denoted as $X_1$.

Figure 4:
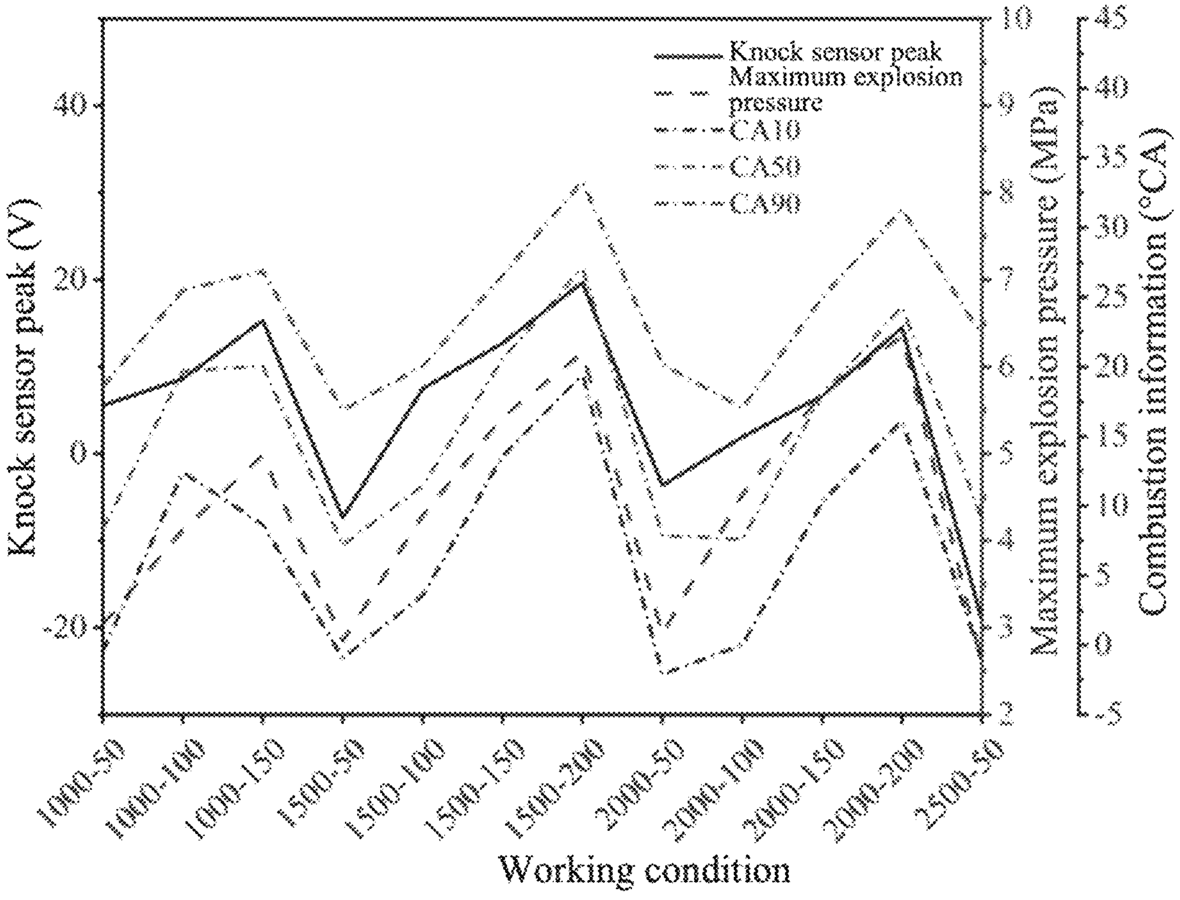
FIG. 4 is a comparison chart of peak features of a knock signal and combustion feature parameters in an example of a value-moving deviation method for acquiring cycle-stage combustion parameters of an engine based on multiple sensing signals.
Figure 5:
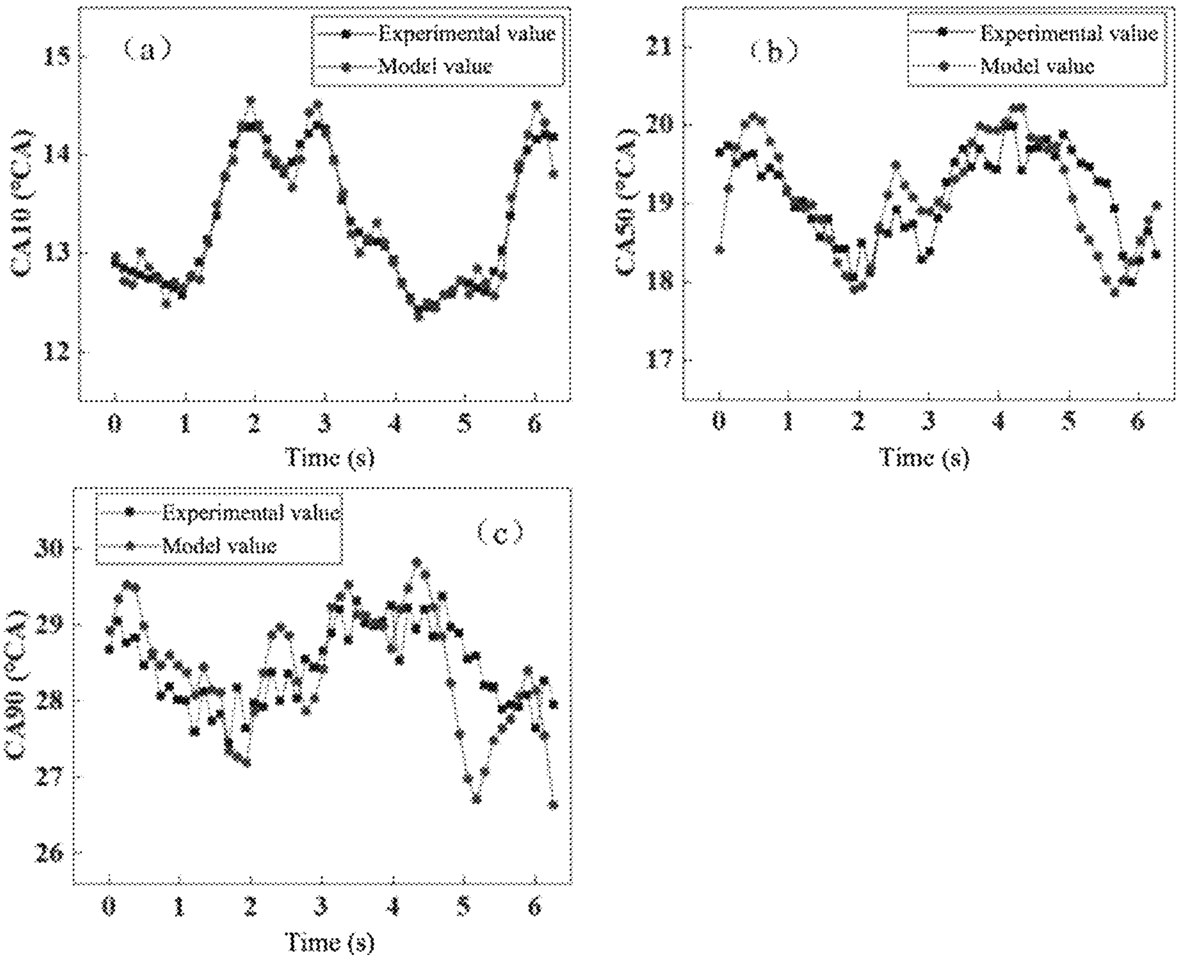
FIG. 5 is a comparison chart of calculated values and experimental values of combustion feature parameters in Example 3 of a value-moving deviation method for acquiring cycle-stage combustion parameters of an engine based on multiple sensing signals, where (a) in FIG. 5 is a comparison chart of CA10, (b) in FIG. 5 is a comparison chart of CA50, and (c) in FIG. 5 is a comparison chart of CA90.

A relation between peak features of the knock signal and the combustion feature parameters is analyzed, and it is found that a variation trend of the peak value of the knock signal and a variation trend of the combustion feature parameters have obvious consistency, as shown in FIG. 4. Thus, by taking the peak value of the knock signal as an input and the combustion feature parameters as an output, a combustion feature parameter reconstruction model is constructed by means of a parameter identification method to reconstruct the combustion feature parameter $X_2$.

(5) Calculation of fusion weight

A deviation between a combustion feature parameter value reconstructed based on each sensing signal feature and the prior value is calculated, and a fusion weight of each feature deviation is calculated according to the reconstructed values of the combustion feature parameters and an actual value calculated by a combustion analyzer. Specific steps are as follows:

Assume that the reconstructed values $X_1$ and $X_2$ of the combustion feature parameters are two variables independent of each other, Y is the actual value of the combustion feature parameters calculated by the combustion analyzer, and $K_i$ represents the fusion weight of the deviation corresponding to $X_i$, a relation between the prior value $\overline{X}$ and the reconstructed values satisfies:

$$Y = \overline{X} + K_i(X_i - \overline{X}).$$

A variance of Y is minimized to determine the fusion weight $K_i$.

Weighted summation is performed on the deviation corresponding to each reconstructed value and the fusion weight to obtain a fusion deviation, i.e.

$$\sum_{i=3}^{2} K_i(X_i - X).$$

(6) The prior value $\overline{X}$ is adjusted according to the fusion deviation to obtain each combustion feature parameter value under a current cycle of the engine, and each piece of transient combustion parameter information is acquired according to a Weber function.

Example 4

For a case of n=3, a sensing signal includes a crankshaft position signal, a knock signal and a rail pressure signal. A principle of a value-moving deviation method is as follows:

$$Z_{core} = \overline{X} + \sum_{i=1}^{3} K_i\left(f_i(\delta_i) - \overline{X}\right),$$

where $f_i(\delta_i)$ is a combustion feature parameter value reconstructed based on a signal acquired by a sensor i.

A signal preprocessing mode of the crankshaft position signal and the knock signal are the same as those in Example 2 and Example 3. The combustion feature parameter values reconstructed based on the two signals are denoted as $X_1$ and $X_2$ respectively, and corresponding weights are denoted as $K_1$ and $K_2$.

For the rail pressure signal, filtering shall be performed, then a filtered signal and a cylinder pressure signal are comparatively analyzed, signal features are extracted, and a combustion feature parameter $X_3$ is reconstructed. A method for determining $K_3$ is the same as that for $K_1$ and $K_2$.

In an actual operation process, steps of a method for extracting signal features and a method for reconstructing combustion feature parameters have been completed before a use of the value-moving deviation method. In other words, each sensing signal feature is preselected. In an actual use process, corresponding signal feature values are directly extracted from the preprocessed signals to reconstruct the combustion feature parameters. Moreover, data transmission and calculation of the combustion parameters can be completed in a single cycle of an engine by means of the above method, and the cycle-stage combustion parameters of the engine can be acquired.

Thus, the above value-moving deviation method for acquiring cycle-stage combustion parameters of an engine based on multiple sensing signals is used in the present disclosure, and can reflect a transient change of the combustion feature parameters by taking the fusion deviation as a transient fluctuation amount, so as to accurately acquire the cycle-stage combustion parameters in real time.

Finally, it should be noted that the above examples are merely used for describing the technical solutions of the present disclosure, rather than limiting the present disclosure. Although the present disclosure is described in detail with reference to the preferred examples, those of ordinary skill in the art should understand that they can still make modifications or equivalent substitutions to the technical solutions of the present disclosure. These modifications or equivalent substitutions do not enable the modified technical solutions to deviate from the spirit and scope of the technical solutions of the present disclosure.

What is claimed is:

1. A value-moving deviation method for acquiring cycle-stage combustion parameters of an engine based on multiple sensing signals, performed on an experimental test platform comprising an engine bench, a time synchronization unit, a controller unit, a combustion analyzer, and an on-board calculation unit;

wherein the engine bench is configured for operating under a command of the controller unit;

the time synchronization unit is configured for collecting a crankshaft position signal, calculating a crankshaft transient angular velocity, and determining a time reference for synchronizing signals;

the controller unit is configured for acquiring sensing signals via sensors arranged on the engine;

the combustion analyzer is configured for collecting, recording and analyzing engine combustion information to provide a reference for a calculation result of the value-moving deviation method; and the on-board calculation unit is configured with the value-moving deviation method, and configured for performing analysis calculation of the sensing signals, calculation of a combustion feature parameter reconstruction model, and calculation of the value-moving deviation method;

and wherein the value-moving deviation method comprising:

S1, acquiring average values of combustion feature parameters of the engine under different working conditions as prior values by means of an engine bench experiment or simulation calculation, and storing the prior values by means of a mathematical model or a map table; establishing shape base models of key shape parameters of Weber equations of combustion heat release rate curves under different working conditions; and establishing a shape relation model of a correction relation between deviation values of the combustion feature parameters and the key shape parameters under each specific working condition;

S2, looking up, according to current working condition information, the mathematical model or the map table storing the prior values of the combustion feature parameters to acquire the prior values of the combustion feature parameters under a current working condition, and obtaining the key shape parameters $a_{base}$ and $m_{base}$ of the Weber equations of the combustion heat release rate curves under the current working condition from the shape base models;

S3, reconstructing combustion feature parameter values based on signal features acquired by a plurality of sensors of the engine, calculating deviations between reconstructed values and the prior values of the combustion feature parameters separately, and determining a weight corresponding to each deviation by means of a probability distribution of the deviations, wherein a method for determining the weight corresponding to each deviation comprises:

establishing a relation between experimental values and the prior values of the combustion feature parameters based on a deviation method:

$$Y = \overline{X} + K_i(X_i - \overline{X}),$$

wherein Y is an experimental value of the combustion feature parameters; $X_i$ is a reconstructed value of an i-th combustion feature parameter, and is independent of each other; $K_i$ is a weight corresponding to $X_i$; and $\overline{X}$ is a prior value of the combustion feature parameters; and determining the weight corresponding to the reconstructed value of each combustion feature parameter according to a method of a minimum variance of the experimental values of the combustion feature parameters;

S4, performing, based on the determined weight, a weighted summation on the deviations to obtain a fusion deviation of the combustion feature parameters as a real-time deviation amount of the combustion feature parameters, wherein a method for calculating the fusion deviation comprises:

calculating a deviation between the reconstructed value and the prior value of each combustion feature parameter; then calculating the weight corresponding to the reconstructed value of each combustion feature parameter; and performing weighted summation on all deviation values to obtain the fusion deviation as follows:

$$\Delta X = \sum_{i=1}^{n} K_i\left(f_i(\delta_i) - \overline{X}\right),$$

wherein ΔX is the fusion deviation, n is a number of types of sensing signals, and $f_i(\delta_i)$ represents the reconstructed value of the combustion feature parameter corresponding to an i-th piece of sensing signal feature information;

S5, correcting, according to the obtained real-time deviation amount, the prior values to obtain actual feature values; and S6, correcting, according to the actual feature values obtained in S5 and the shape relation model, the key shape parameters $a_{base}$ and $m_{base}$ of the Weber equations obtained by means of the shape base models, and updating a mathematical expression of the combustion heat release rate curves to obtain each combustion parameter value under a current cycle; and outputting the obtained each combustion parameter value for engine combustion control.

2. The value-moving deviation method for acquiring cycle-stage combustion parameters of the engine based on multiple sensing signals according to claim 1, wherein in S3, a process for reconstructing the combustion feature parameter values comprises: preprocessing each sensing signal, comparatively analyzing a preprocessed sensing signal curve and a cylinder pressure curve and the combustion heat release rate curves, extracting feature information related to a combustion state of the engine, and establishing a mapping model or a function of a relation between the sensing signal feature information and the combustion feature parameters according to correlation between the sensing signal feature information and the combustion feature parameters.

3. The value-moving deviation method for acquiring cycle-stage combustion parameters of the engine based on multiple sensing signals according to claim 1, wherein the value-moving deviation method refers to movement of the combustion feature parameter values on the combustion heat release rate curves based on the fusion deviation, and is specifically expressed as follows:

$$Z_{core} = \overline{X} + \Delta X = \overline{X} + \sum_{i=1}^{n} K_i\left(f_i(\delta_i) - \overline{X}\right),$$

wherein $Z_{core}$ is a combustion feature parameter value obtained after value-moving.

4. The value-moving deviation method for acquiring cycle-stage combustion parameters of the engine based on multiple sensing signals according to claim 1, wherein a method for updating the combustion heat release rate curves specifically comprises:

updating, according to the shape relation model of the correction relation between the deviation values of the combustion feature parameters and the key shape parameters of the Weber equations under a specific working condition, $a_{base}$ and $m_{base}$ obtained from the shape base model to obtain updated key shape parameters a and m of the Weber equations; and substituting updated combustion feature parameters, incorporating a and m into a Weber function to obtain the combustion heat release rate curves of a cycle of the current working condition, so as to further obtain each combustion parameter value, specifically as follows:

$$Q(\theta) = 1 - \exp\left[-a\left(\frac{\theta - \theta_0}{\Delta\theta}\right)^m\right],$$

wherein $Q(\theta)$ is a cumulative heat release rate when a crankshaft angle is $\theta$; $\theta_0$ is the crankshaft angle corresponding to a starting combustion moment; and $\Delta\theta$ is a combustion duration;

and a and m are the key shape parameters and depend on a working condition state.

5. The value-moving deviation method for acquiring cycle-stage combustion parameters of the engine based on multiple sensing signals according to claim 1, wherein calculation of combustion parameters is completed within a single cycle of the engine, and the cycle-stage combustion parameters are obtained.

* * * * *